United States Patent [19]

Meininger et al.

[11] 3,907,495
[45] Sept. 23, 1975

[54] PROCESS FOR THE DYEING OR PRINTING OF NITROGEN CONTAINING TEXTILE MATERIALS

[75] Inventors: Fritz Meininger, Frankfurt (Main); Klaus Hunger, Kelkheim, Fritz Osterloh, Bad Soden, Klaus Berner, Hofheim, all of Germany

[73] Assignee: Hoechst Aktiengesellschaft, Frankfurt (Main), Germany

[22] Filed: Oct. 11, 1973

[21] Appl. No.: 405,427

[30] Foreign Application Priority Data
Oct. 14, 1972 Germany.............................. 2250450

[52] U.S. Cl. ............................. 8/39; 8/1 P; 8/41 B; 8/54; 8/163
[51] Int. Cl.² ....................... D06P 1/06; D06P 1/39
[58] Field of Search ........... 8/1 P, 163, 39, 41 B, 54

[56] References Cited
UNITED STATES PATENTS

| | | | |
|---|---|---|---|
| 3,098,064 | 7/1963 | Schultheis | 260/176 |
| 3,301,884 | 1/1967 | Meininger et al. | 260/453 |
| 3,414,367 | 12/1968 | Welch et al. | 8/17 |
| 3,788,801 | 1/1974 | Hille et al. | 8/1 P |

*Primary Examiner*—Joseph L. Schofer
*Assistant Examiner*—A. L. Clingman
*Attorney, Agent, or Firm*—Curtis, Morris & Safford

[57] ABSTRACT

Process for dyeing or printing nitrogen containing native or synthetic fibrous materials, such as wool, silk or fibres of polyamide, which comprises the dyeing or printing of the said fibrous materials with a water-soluble dyestuff of the formula

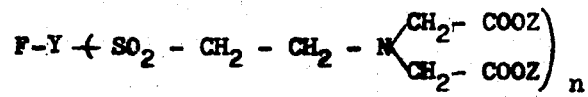

in which F represents the rest of a monoazo- or 1-amino-4-phenyl-amino-anthraquinone-2-sulfonic acid dyestuff, Y represents a direct linkage or one of the groups

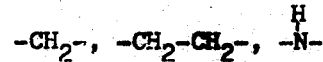

or

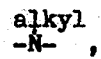

Z represents a hydrogen atom or an alkali metal atom or the ammonium group, and n represents the integer 1, 2 or 3, at a temperature between about 20° and about 115° C and at a pH-value between about 4.0 and about 7.5, the dyeings and prints so prepared being distinguished by very good fastness to processing and fastness to wear, such as fastness to wet and fastness to light.

5 Claims, No Drawings

PROCESS FOR THE DYEING OR PRINTING OF NITROGEN CONTAINING TEXTILE MATERIALS

The present invention relates to a process for the dyeing or printing of nitrogen containing native or synthetic fibrous materials.

It has been found that fast dyeing or prints can be produced on nitrogen containing native or synthetic fibrous materials, such as wool, silk, polyamide or polyurethane fiber materials, by dyeing or printing the said fibrous materials with water-soluble dyestuffs of the general formula (1)

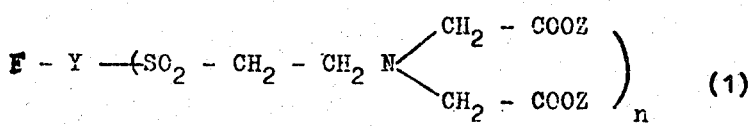

in which F stands for the rest of a monoazo or 1-amino-4-phenyl-aminoanthraquinone-2-sulfonic acid dyestuff, Y for a direct linkage or for one of the groups

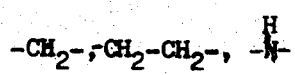

and

Z stands for a hydrogen atom or an alkali metal atom or for the ammonium group, and $n$ stands for the integer of 1, 2 or 3, at temperatures of from about 20° to about 115° C, preferably from about 40° C to about 110° C, and at pH-values of from about 4.0 to about 7.5.

The dyestuff rest F may be rests of monoazo dyestuffs containing, as coupling component, for example, the rests of naphthols, naphthol sulfonic acids, naphthol carboxylic acid amides, pyrazolones or aceto-acetic acid arylamides. The monoazo dyestuff rests may contain, as diazo components, amines of the benzene or naphthalene series which, likewise as the coupling components, may carry hydroxy, amino, alkyl, alkoxy, phenyl, acetylamino, benzoylamino and/or N-phenyl-carbon-amido groups and/or halogen atoms, such as chlorine or bromine atoms, all linked to the aromatic nucleus.

The dyeings are produced, for example either by directly dyeing from a dyebath containing inorganic salts, where required, for example alkali metal chlorides or sulfates, at the above indicated temperatures and pH-values. The dyebath may also contain auxiliary agents, for example levelling agents.

Dyestuffs of most closely related constitution that contain a grouping of the formula $-SO_2-CH_2-CH_2-X$ instead of the grouping of the following formula (2), in which X stands for an organic or inorganic rest capable of being split off as an anion, except for the imino-diacetic acid, require an alkaline pre- and/or after-treatment for the production of a dyeing which is fast to wet processing on one of the aforementioned nitrogen containing fibrous materials.

The dyestuffs used are prepared from dyestuff components or dyestuffs containing the vinyl-sulfonyl group $-SO_2-CH=CH_2$ or the group $-SO_2-CH_2-CH_2-X$, X representing an organic or inorganic rest capable of being split off as an anion, for example the acetoxy, phenoxy, methyl-sulfonyloxy or, preferably, the sulfatoxy or chlorine radical, except for the radical of imino-diacetic acid, by reacting these compounds with aminodiacetic acid in an aqueous medium in the presence of alkaline compounds, for example alkali metal hydroxides, carbonates or bicarbonates, at 0° to 100° C, preferably at 20° to 60° C. After the pH-value has been adjusted to 5 – 7 or a strong acid has been added, the desired dyestuffs of the above-cited general formula (1) or the dyestuff components containing the β-(imino-diacetic acid)-ethylsulfonyl rest of the formula (2)

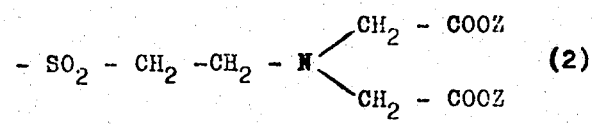

in which Z stands either for a hydrogen atom, a sodium or potassium atom or the ammonium group, depending on the pH-values chosen and the alkaline compound used, are obtained.

The dyestuffs are prepared from the dyestuff components containing the rest of the formula (2) according to the methods known per se, for example by azo coupling or by halogenoanthraquinone condensation. The novel dyestuffs may contain one to three groupings of the formula (2) per molecule.

The dyestuffs used according to the invention are distinguished, in comparison to the dyestuffs of the mentioned type having a similar structure, in that they do not require an alkaline pre- or after-treatment for the dyeing of nitrogen containing fibrous materials.

Used on the cited nitrogen containing fibrous materials, the novel dyestuffs used according to the invention afford valuable bright dyeings and prints which are distinguished by very good fastness to processing, such as fastness to fulling and pleating, and very good general fastness properties, such as fastness to wet processing, for example to washing, wetting and perspiration, as well as very good fastness to light. When the fastness to wet processing is being tested by extracting the dyed fibrous material with an aqueous pyridine solution, no decrease in color intensity is observed.

The present simplified dyeing and printing process is a substantial improvement in the dyeing method disclosed in German Pat. Nos. 965,902 and 966,651.

The following Examples serve to illustrate the invention, the parts and percentages being by weight unless stated otherwise.

EXAMPLE 1

100 Parts of a woollen fabric were treated for some minutes at 40° C in 5000 parts by volume of an aqueous liquor containing 1 part of the dyestuff of the formula

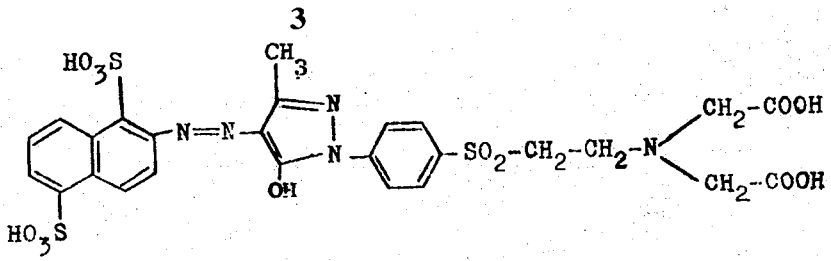

and 10 parts of an anhydrous sodium sulfate, the pH-value of the liquor being adjusted to 5 by means of acetic acid. The liquor was heated to 70° C within 15 minutes, the fabric was dyed for 15 minutes at this temperature, the bath was again heated to 70° C for 15 minutes, dyeing was continued for 15 minutes at this temperature, the temperature of the bath was brought to the boil for 15 minutes and dyeing was continued for half an hour at this temperature. A bright yellow dyeing having very good fastness to wet processing was obtained.

EXAMPLE 2

A woollen fabric was printed with a printing paste containing, per 1000 parts, 400 parts of crystal gum (of 6%), 2 parts of acetic acid (of 30% strength), 20 parts of the sodium salt of m-nitro-benzene-sulfonic acid and 20 parts of the dyestuff of the formula

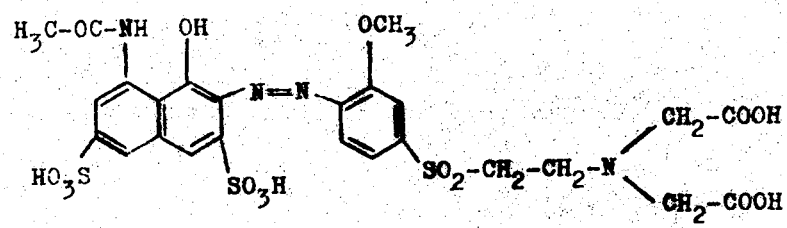

the paste having been standardized with 558 parts of water or crystal gum (6%) to a volume of 1000 parts. The print was then dried and steamed for 30 minutes at a pressure of 0.5 atmosphere gauge. A bluish red print having very good fastness to wet processing was obtained.

EXAMPLE 3

100 Parts of a polyamide fabric were dyed for 1 hour at 98°C in 5000 parts by volume of an aqueous liquor containing 1 part of the dyestuff of the formula

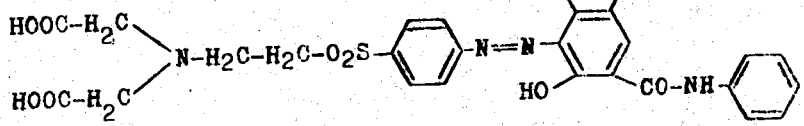

and the pH-value of which was adjusted to 6 by means of acetic acid. The dyeing obtained had a reddish orange shade and very good fastness properties to wet processing.

EXAMPLE 4

100 Parts of natural silk were treated at 20° C in 5000 parts by volume of an aqueous liquor containing 1 part of the dyestuff of the formula

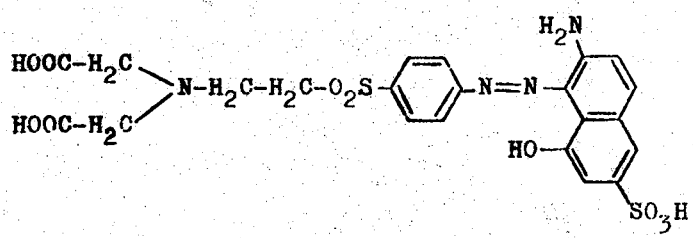

and the pH-value of which had been adjusted to 5.5 by means of formic acid. The dyebath was heated to the boil and the goods were dyed for 1 hour at boiling temperature. A red dyeing having very good fastness to wet processing was obtained.

EXAMPLE 5

A polyamide fabric was printed with a printing paste containing, per 1000 parts, 400 parts of crystal gum (6%), 1 part of acetic acid (30%), 10 parts of the sodium salt of m-nitro-benzene-sulfonic acid and 20 parts of the dyestuff of the formula

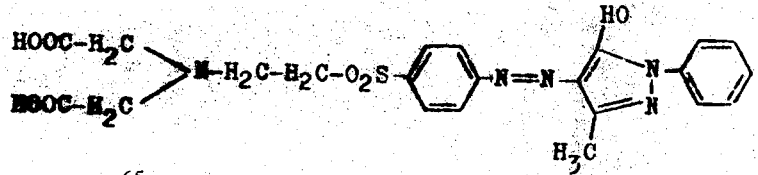

the paste having been standardized with 569 parts of water or crystal gum (6%) to a volume of 1000 parts. The print was dried and steamed for 30 minutes at a pressure of 0 to 5 atmospheres gauge. A yellow print having very good fastness to wet processing was obtained.

EXAMPLE 6

100 Parts of woollen yarn were dyed in a pressure dyeing apparatus for 30 minutes at 105°C in 1000 parts by volume of an aqueous liquor containing 1 part of the dyestuff of the formula

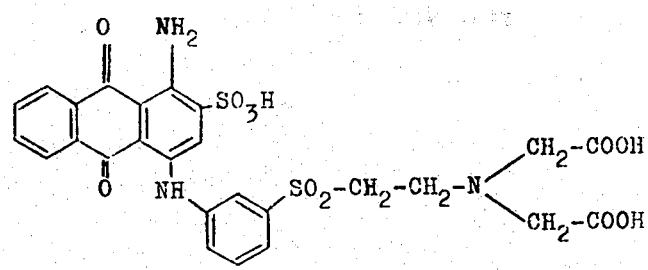

and the pH-value of which was adjusted to 5. A brilliant blue dyeing having very good fastness to wet processing was obtained.

EXAMPLE 7

When 1 part of the dyestuff of the formula

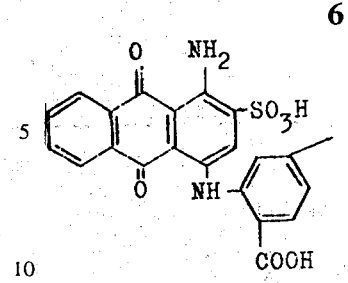

was used instead of the dyestuff used in Example 6 and the dyeing operation was carried out as in Example 6, a somewhat more greenish brilliant blue dyeing was obtained on the woollen yarn.

The following Table comprises further dyestuffs to be used according to the invention as well as the shades obtainable with these dyestuffs upon the dyeing of wool.

TABLE

| No. | dyestuff | Shade on wool |
|---|---|---|
| 8 | (azo dye structure with phenyl-SO₂-CH₂-CH₂-N(CH₂COOH)₂ coupled to amino-naphthol-sulfonic acid) | red |
| 9 | (azo dye with CH₃-N(-SO₂CH₂CH₂N(CH₂COOH)₂)-phenyl coupled to hydroxy-naphthalene-sulfonic acid) | orange |
| 10 | (azo dye with OCH₃, CH₂SO₂CH₂CH₂N(CH₂COOH)₂ substituted phenyl coupled to dihydroxy-naphthalene disulfonic acid with NH-CO-phenyl group) | red |

TABLE (continued)

| No. | dyestuff | Shade on wool |
|---|---|---|
| 11 | 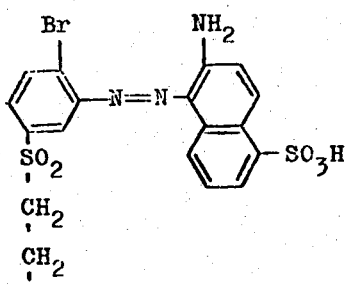 | yellowish red |
| 12 | 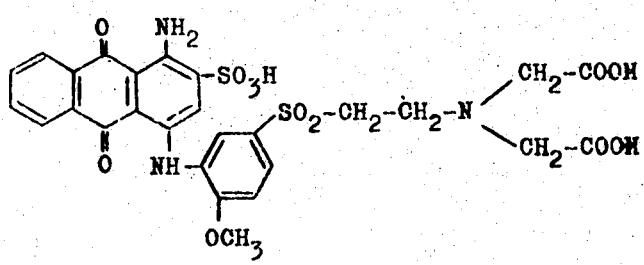 | blue |
| 13 | 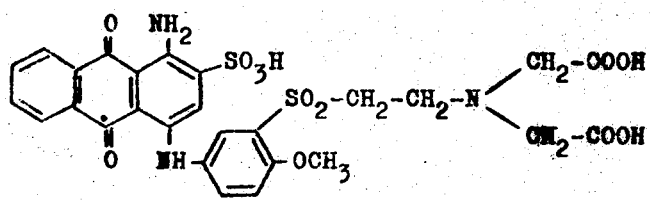 | blue |

We claim:

1. Process for dyeing or printing nitrogen containing native or synthetic fibrous materials, which comprises the dyeing or printing of the said fibrous materials with a water-soluble dyestuff of the formula

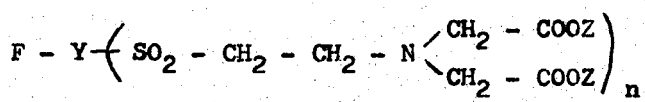

in which F represents the rest of a monoazo-or 1 amino-4-phenyl-amino-anthraquinone-2-sulfonic acid dyestuff, Y represents a direct linkage or one of the groups $-CH_2-$, $-CH_2-CH_2-$, $-\overset{H}{N}-$ or $-\overset{alkyl}{N}-$, Z represents a hydrogen or alkali metal atom or the ammonium group, and n represents the integer 1,2 or 3, at a temperature between about 20° and about 115° C, and at a pH-value between about 4.0 and about 7.5.

2. Process as claimed in claim 1, wherein dyeing or printing is carried out at a temperature between about 40° and about 110° C.

3. Process as claimed in claim 1, wherein dyeing is carried out according to the exhaust process.

4. Process as claimed in claim 1, wherein the dyestuff is applied to the fibrous materials by a printing process and the dyestuff is subsequently fixed by steaming at about 115° C.

5. Process as claimed in claim 1, wherein dyeing is carried out under pressure at 105° C.

* * * * *